Oct. 1, 1935.  H. D. G. WECKERLY ET AL  2,015,774
SKYLIGHT CONSTRUCTION
Filed Jan. 4, 1935
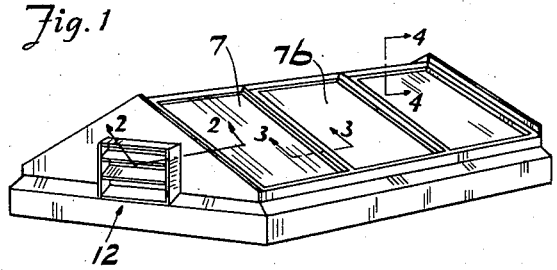
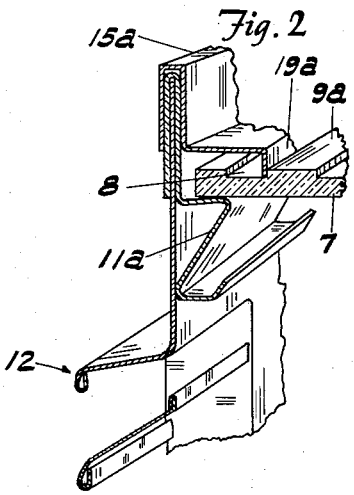
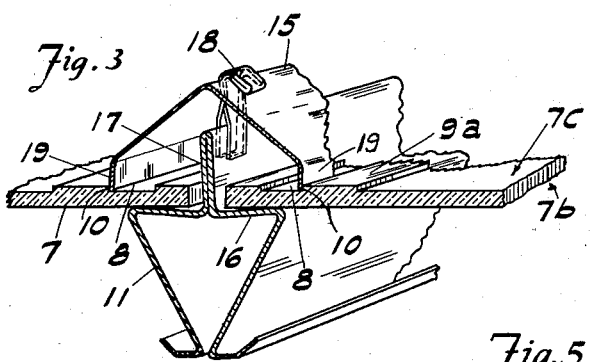
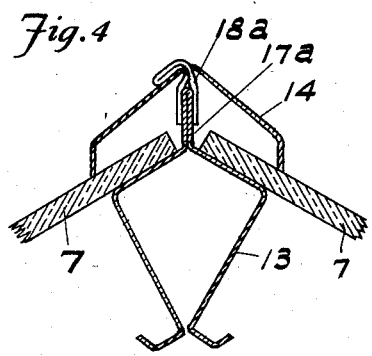
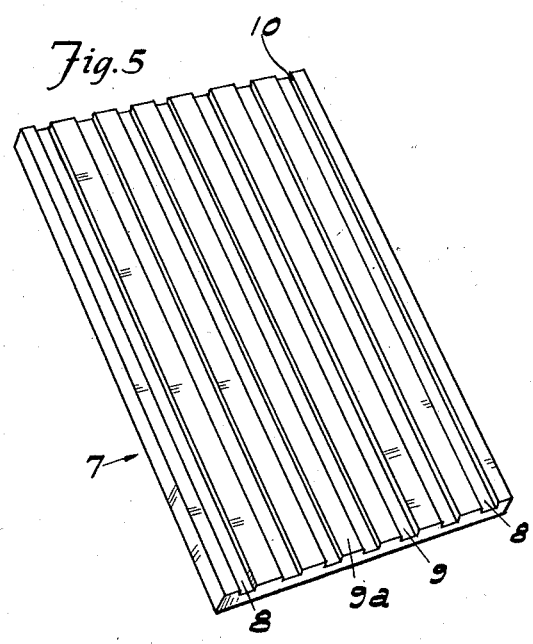
Edwin T. Norman
Hugh D. G. Weckerly
INVENTORS
BY
ATTORNEY Patented Oct. 1, 1935

2,015,774

UNITED STATES PATENT OFFICE 2,015,774

SKYLIGHT CONSTRUCTION

Hugh D. G. Weckerly and Edwin T. Norman,
San Diego, Calif.

Application January 4, 1935, Serial No. 415

3 Claims. (Cl. 108—16)

The present invention relates to an improvement in skylight construction and particularly to a glass therefor.

It is one of the important objects of the invention to provide for the attainment of an improvement in skylight construction thru the use of a particularly constructed channel glass which is adapted for cutting into various sizes without affecting its adaptability for such use.

It is one of the important objects of the invention to provide, for use in combination with present day skylight frame construction, an improved type of skylight glass having channels in its exposed surface which together with other parts more fully to be hereinafter described form a water seal for the construction.

It is one of the objects of the invention to provide a channel glass wherein the ribs forming the channels are rectangular in cross section and provide a vertical wall against which a depending part of the conventional cap abuts, and a barrier against which the elements may strike, the channel in the glass adjacent said part serving as a drain for the moisture which passes underneath such part.

It is an object of the invention to provide a skylight construction wherein the cost and labor of puttying is eliminated and at the same time easy detachability of the glass in case of cleaning, repair or possibly ventilating or other purposes is permitted.

It is an object of the invention to provide a skylight construction which will confine the water to the glass parts only, thereby reducing to a minimum deterioration of interior parts caused by the entrance of moisture from the outside.

It is also an important object of the invention to provide, as a new article of manufacture, a novel skylight glass per se which may be handled with less danger of breaking and also wherein there is, after installation, less chance of breakage due to expansion and contraction, earthquake vibrations and settling.

Yet another object of the invention is to provide a skylight construction which may be installed in a quicker and more satisfactory manner yet without danger of joints of a character permitting leakage. This improved feature of the invention resides mainly in the novel manner in which the skylight glass is shaped.

Still other objects, advantages, and features will hereinafter appear.

An embodiment of the invention is shown in the accompanying drawing wherein—

Fig. 1 is a diagrammatic applicational perspective view of a typical gable skylight embodying our improved construction.

Fig. 2 is a fragmentary perspective sectional view taken on line 2—2 of Fig. 1.

Fig. 3 is a fragmentary perspective sectional view taken on line 3—3 of Fig. 1.

Fig. 4 is a fragmentary cross section taken on line 4—4 of Fig. 1.

Fig. 5 is a perspective view of the novel skylight glass per se.

The invention is disclosed in connection with a gable skylight having a plain louvered end perspectively shown in Fig. 1. This view is somewhat constructional as well as diagrammatical and owing to the smallness of the scale to which the figure is drawn the full surface detail of the glass as well as other constructional parts shown in detail in the larger sections are omitted. However, the novel skylight glass per se is comprehensively shown in Fig. 5 and its utility is set forth in the large size detail sections in Figs. 2, 3 and 4.

While we show the embodiment as applied to a gable skylight it is to be understood that the glass sections are not limited or restricted to such use for they are equally applicable to flat skylights, hip skylights and many other types as well.

Referring in detail to the drawing the translucent glass sections 7, one of which is separately shown in Fig. 5, are preferably all of the same design, each have a series of spaced parallel grooves or channels 8 and 9 extending across their upper faces, the side channels being designated 8 and the intermediate channels 9. All of said channels are preferably constructed alike so that the glass sections may be cut into various sizes without affecting the utility of the glass in connection with conventional sheet metal skylight frame sections with which it is used. In order to provide as nearly a water-tight seal as possible between the metal sections and glass sections without the use of putty, flashing or any packing whatsoever, we preferably construct the walls 10 so as to upstand at a right angle to the bottom of the channel. Between adjacent grooves are the ribs 9a which are rectangular as viewed in cross section.

In Fig. 2 the skylight construction at one end of the gable of the skylight is disclosed, a fragmentary part of a louver construction 12 being shown below the semi-common bar 11a. A semi-cap bar 15a is also shown in this view, its depending flange 19a being seated within the adjacent groove 8 of the glass plate 7.

In Fig. 4 is shown a cross section wherein the ridge bar 13 supports the upper edge portions of the cover sections 7, and the ridge cap bar 14 is shown surmounting the structure in the usual manner, the bar 13 having an upward extension 17a and the clip 18a holding these parts together.

Referring more particularly to Fig. 3, which illustrates the invention as applied to the construction of a weather proof connection between the adjacent edges of the glass sections 7, the supporting common bar 11 and the cap bar or plate 15 are of well known construction, said common bar having at each side a glass-supporting shoulder 16 and having an upstanding central portion 17 to which is secured, by means of the clip 18 the cap bar 15. Along each side the gable-shaped cap bar 15 has a depending flange or edge portion 19 which preferably extends vertically downward. Each said flange 19 is seated within a side groove 8 of one of the glass members 7, and is placed in an abutting relation to the wall 10 of said groove. This construction provides a nearly water-tight connection between the cap bar and the glass. The slight leakage that may occur between the groove wall 10 and adjacent part of the cap bar will be safely taken care of by the part of the groove 8 at the inner side of the cap bar flange 19.

In the right hand portion of Fig. 3 is shown a modified form of glass plate 7b having, between its outer grooves, a plain surface 7c, thus simplifying the manufacture of said plate.

It will be observed that all of the grooves 8 and 9 are of considerable width and have flat bottoms and that the glass structure as a whole may be slightly shifted. The thickness of the edge portions 19 of the bar 15 is a great deal less than the width of any of said grooves wherein said edge portions 19 may be seated. Hence abundant drainage will be provided along the inner side of said edge portion 19 even if it be in a somewhat spaced relation to the outer wall of the groove in which it seats, as may sometimes be necessary or expedient in assembling the construction.

We claim:

1. In a skylight construction, a translucent cover section having in its exposed face a groove having a perpendicular wall extending in a parallel spaced relation to one of its edges, means to support said section in its operative position, and a cap plate having a depending portion which abuts against a side wall of said groove, there being sufficient clearance between the perpendicular walls forming the groove and the depending portion occupying said groove to permit shifting of said cover section relative to said depending portion.

2. In a skylight construction, a translucent cover plate having an upwardly directed face portion with a groove therein, and a cap plate having a depending edge portion extending along said groove and resting upon the bottom thereof forming a water seal for said construction, said groove having a flat bottom greatly exceeding in transverse extent the width of said depending edge portion to allow transverse adjustment of said edge portion within said groove.

3. The combination with a support having an upstanding rib and a flange projecting laterally from said rib; of a transparent plate mounted on said flange and having an edge in normal spaced relation to and adjacent said rib, said plate having a flat bottomed groove on its upper face extending parallel to said edge, and a cap member secured to said groove and having a free edge engaging in said groove, the groove width being several times the thickness of the cap edge engaging therein whereby the plate may expand and contract under the influence of heat changes to cause the said plate edge to vary in distance from said rib while maintaining the cap edge in engagement with the groove without distortion of the cap.

HUGH D. G. WECKERLY.
EDWIN T. NORMAN.